United States Patent [19]

Hill et al.

[11] Patent Number: 4,570,296
[45] Date of Patent: Feb. 18, 1986

[54] GIZZARD HARVESTING APPARATUS

[76] Inventors: William J. Hill, Rte. 3, Box 230, Ball Ground, Ga. 30107; Carl J. Hill, deceased, late of Ball Ground, Ga.; by Hazel R. Hill, executrix, Rte. 3, Box 229, Ball Ground, Ga. 30107

[21] Appl. No.: 721,611

[22] Filed: Jun. 3, 1985

Related U.S. Application Data

[62] Division of Ser. No. 374,771, May 4, 1982, Pat. No. 4,524,491.

[51] Int. Cl.⁴ .............................................. A22C 21/00
[52] U.S. Cl. ......................................... 17/11; 17/50; 17/51
[58] Field of Search ................... 17/11, 51, 45, 43, 21, 17/50

[56] References Cited

U.S. PATENT DOCUMENTS

| | | | |
|---|---|---|---|
| 2,787,362 | 4/1957 | Hill | 17/11 |
| 3,990,128 | 11/1976 | van Mil | 17/43 |
| 4,183,117 | 1/1980 | Meyn | 17/11 |
| 4,249,284 | 2/1981 | Graham et al. | 17/11 X |
| 4,395,795 | 8/1983 | Hazenbroek | 17/11 X |

Primary Examiner—Willie G. Abercrombie
Attorney, Agent, or Firm—Willian Brinks Olds Hofer Gilson & Lione Ltd.

[57] ABSTRACT

An apparatus for processing poultry gizzards at substantially high line speeds. A plurality of gizzards preferably with the stomach and intestines attached are directed in a random arrangement into a feeding and aligning station. Feed roll means at that station apply an initial orienting force to each gizzard and transport each gizzard along a predetermined path. Orienting means adjacent said feed roll means applys a second orienting force to each gizzard which cooperates with the first orienting force to orient each gizzard into a preselected position. Means are also provided to secure each gizzard in said preselected position. Means then remove the stomach and intestines from the tender lining of each gizzard. Slitting and spreader means slit and open each gizzard, and cleaning means flush the contaminants from the opened gizzards. Shearing means then engage and remove the residual tender lining from each gizzard, and peeling means peel the interior lining or membrane from the gizzards.

8 Claims, 9 Drawing Figures

Fig. 1.

Fig. 2

GIZZARD HARVESTING APPARATUS

This application is a division of application Ser. No. 374,771, filed May 4, 1982, now U.S. Pat. No. 4,524,491.

BACKGROUND AND GENERAL DESCRIPTION

This invention relates to an improved method and apparatus for processing poultry gizzards, and more particularly relates to an improved gizzard harvester and method of operation therefor which automatically processes poultry gizzards on a high-speed, mass production basis.

The processing of poultry gizzards into condition for use and consumption requires that the gizzards be opened and cleaned; the contaminating contents removed; the stomach and gut or intestines trimmed off the gizzard; and the interior lining or membrane skimmed off and discarded. These steps are necessary because the processed gizzards must pass rigorous quality and hygiene standards imposed by the industry and by governmental agencies and regulations. If any of the above treatments are not thoroughly and properly completed, the resulting product may be of low quality, or may be contaminated so as to fail inspection. There is thus a constant search for improvements in the method and apparatus for processing gizzards which would meet the rigorous quality and hygiene standards applicable in this field.

Other requirements for harvesting gizzards are that the activity must be conducted efficiently and economically on a high-speed, mass production basis, with a minimum of hand labor. The high speeds are necessary so that the harvester apparatus and process handles gizzards at a speed which is compatible with the increasingly higher line speeds utilized in modern poultry processing plants. For example, poultry processing plant line speeds have increased in recent times from approximately 50 units per minute to 70 to 75 units per minute. The expectation is that line speeds will be raised even higher in the future, because of the pressures of economics and the need for increased efficiency.

To perform these gizzard processing functions at such high-speed levels, the functions of the machine and process must be integrated for a smooth and continuous operation, and the utilization of hand labor must be minimized. Moreover, whatever manual labor that is needed should be unskilled labor. In addition, the processing apparatus should be compact in design, to operate within a minimum space within a poultry processing plant. Likewise, all of the needed processing steps should be performed with a minimum number of machines. The process and apparatus should also minimize the gizzard rejects and thereby increase the yield from the processing operation.

Prior gizzard harvesting apparatus and processes which have attempted to meet the foregoing criteria, have met with varying degrees of success. The present invention meets these criteria by providing an improved apparatus and process which handles poultry gizzards on a mass production basis with a minimum of unskilled hand labor, and with a compact design which permits the processing to be accomplished at substantially high line speeds. For example, the present invention minimizes hand labor requirements by providing an apparatus and process which operate on gizzards having the stomachs and intestines attached. Thus, the hand labor needed to cut off the stomach and/or the intestines from the gizzard, before processing with some previous machines, has been eliminated.

In addition, the invention eliminates the criticality of the condition in which the gizzards are introduced into the harvester. In accordance with this invention, the gizzards having the stomach and intestines attached can be pulled from the poultry by unskilled labor, and the gizzard and the attached portions can be randomly fed into the harvesting machine. The processing operation is thereby initiated without the need to be concerned with the initial orientation of the gizzards. Rather, the randomly fed gizzards will be arranged automatically into the desired predetermined orientation by the operation of the harvester.

Many of the features and advantages of the present invention accrue because complete and accurate control of the gizzards is established at all stages of the operation. At the initial stages of operation of the harvester, the control of the gizzards is accomplished by utilizing the stomach and intestines attached to the gizzards. Once such initial control of the gizzards is obtained, and the gizzards are oriented into a desired position, the attached stomach and intestines are removed, and the gizzards are controlled by other means throughout the remaining operations of the harvester. The subsequent operations function to completely open and clean the gizzard; to trim the tender lining from each gizzard which remains after the stomach and intestines have been sheared; and to peel the interior membrane or lining from each gizzard.

Briefly described, the advantages and features of the present invention are provided by a poultry gizzard harvesting apparatus which is adapted to process gizzards having portions including the stomach and the intestines attached. The use of expensive hand labor is minimized because the gizzards can be removed directly from the poultry and dropped into the machine in a random arrangement. The hand trimming of stomachs and/or intestines, and the attendant costs and problems, are thereby eliminated. The harvester receives a plurality of the gizzards and feeds the gizzards into a feeding and aligning station. This feeding and aligning station includes feed roll means for engaging the stomach and the intestines to apply an initial orienting force to each gizzard. The force of the feed roll means arranges each gizzard in an initial orientation, and also transports the gizzard laterally along a predetermined path through the harvester.

After the randomly-fed gizzards are initially oriented by the feed roll means, the gizzards are directed to orienting means adjacent the feed rolls means. The orienting means is adapted to engage each gizzard sequentially, and to apply a second orienting force directly to each gizzard while the feed roll means maintains the first orienting force applied through the stomach and intestines. In accordance with this invention, the first orienting force applied by the feed roll means, and the second orienting force applied by the orienting means, cooperate to arrange each gizzard into a preselected position for further processing.

The harvester pursuant to this invention also includes means for securing each gizzard in the preselected position while the gizzard is conveyed along a predetermined path within the harvester. Once the gizzards are so secured, a shearing station provided by the harvester then functions to simultaneously remove the attached stomach and intestines from each gizzard. The removal of the stomach and intestines occurs automatically after the gizzard is secured in this preselected position. The shearing station removes the stomach and intestines by shearing closely to the body of the gizzard, to minimize the residual tender lining of the stomach and intestines remaining on the gizzard. After the stomach and intestines are removed, the harvester conveys the gizzard in its preselected position to a slitting station, where slitting means such as a saw opens each gizzard. Next, spreader means positioned adjacent the path of travel of the gizzard open each slit gizzard to expose the interior lining or membrane and the contents of the gizzard. Flushing means then flush out the interior of the opened gizzard, to remove the contaminants. Thereafter, the harvester provides shearing means engagable with the edge of each gizzard to remove the residual tender lining to which the stomach and intestines had been attached. Such a trimming of the tender lining increases the yield of the machine by eliminating the tender lining as a source of contamination. Finally, the harvester provides peeler means to engage with and peel the interior membrane or lining from each gizzard. The gizzard is then prepared for further processing or consumption.

DESCRIPTION OF AN ILLUSTRATIVE EMBODIMENT

Further objects and features of the present invention will become apparent from the description of an illustrative embodiment thereof, taken in conjunction with the accompanying drawings, in which.

Figure 1:
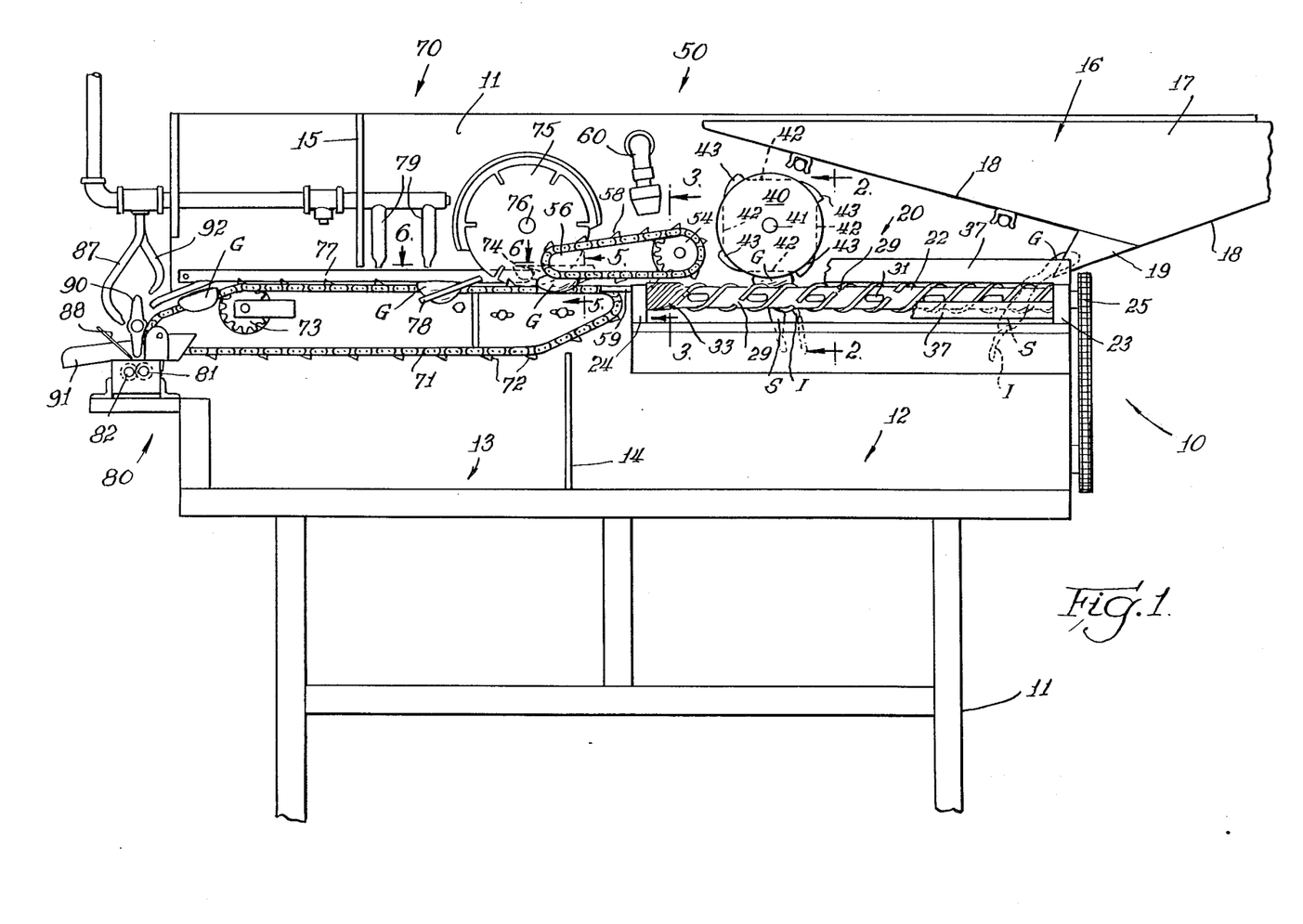
FIG. 1 is a side elevational view of an illustrative embodiment of the gizzard harvester in accordance with the present invention.

Referring generally to the drawings, the gizzard harvester embodying the features and advantages of the present invention is generally identified by the reference numeral 10. As seen in FIG. 1, the harvester 10 includes a support frame 11 which defines an initial flush trough 12 and a final flush trough 13. An isolation wall 14 between the troughs 12 and 13 isolates the troughs and minimizes the splashing during the operation of the machine 10. The frame 11 includes another isolation wall 15 which operates to isolate the slitter and spreader section of the harvester 10 from the trimming and peeling section. The flush troughs 12 and 13 operate in a conventional manner to collect and discard the waste material resulting from the operation of the poultry gizzard harvester 10.

As also shown in FIG. 1, the feeding end of the harvester 10 is provided with a hopper 16 for receiving gizzards and directing the gizzards to the harvester. In the preferred arrangement, the feed hopper 16 includes side walls 17 and converging bottom walls 18. The bottom walls 18 lead to an inclined discharged chute 19. The hopper 16 is generally symmetrical about its center line, so that the inclined walls 18 form a generally triangular hopper leading to the discharged chute 19. Thus, the hopper 16 can be fed by two operators, with one operator stationed at each end of the hopper. By this arrangement, the harvesting machine 10 can be positioned in a poultry processing line, and gizzards including the stomachs and intestines can be pulled from the poultry by two operators and placed in the hopper 16 in a random arrangement. The inclined bottom walls 18 of the hopper will direct the randomly arranged gizzards downwardly to the chute 19, and discharge the gizzards into a feeding and aligning station 20 provided in the harvester 10.

The functions of the station 20 are to orient each gizzard in a predetermined position for further processing and to feed the gizzards in the proper orientation along a predetermined path. In accordance with this invention, the attached portions of the gizzard, including the stomach and intestines, are utilized to orient the gizzard initially in the station 20. After the proper orientation is established, each gizzard is then secured in its preselected position. Then, with the gizzard so secured, the stomach and intestines are sheared from the gizzard substantially simultaneously, and are discarded by gravity into the flush trough 12.

Figure 2:
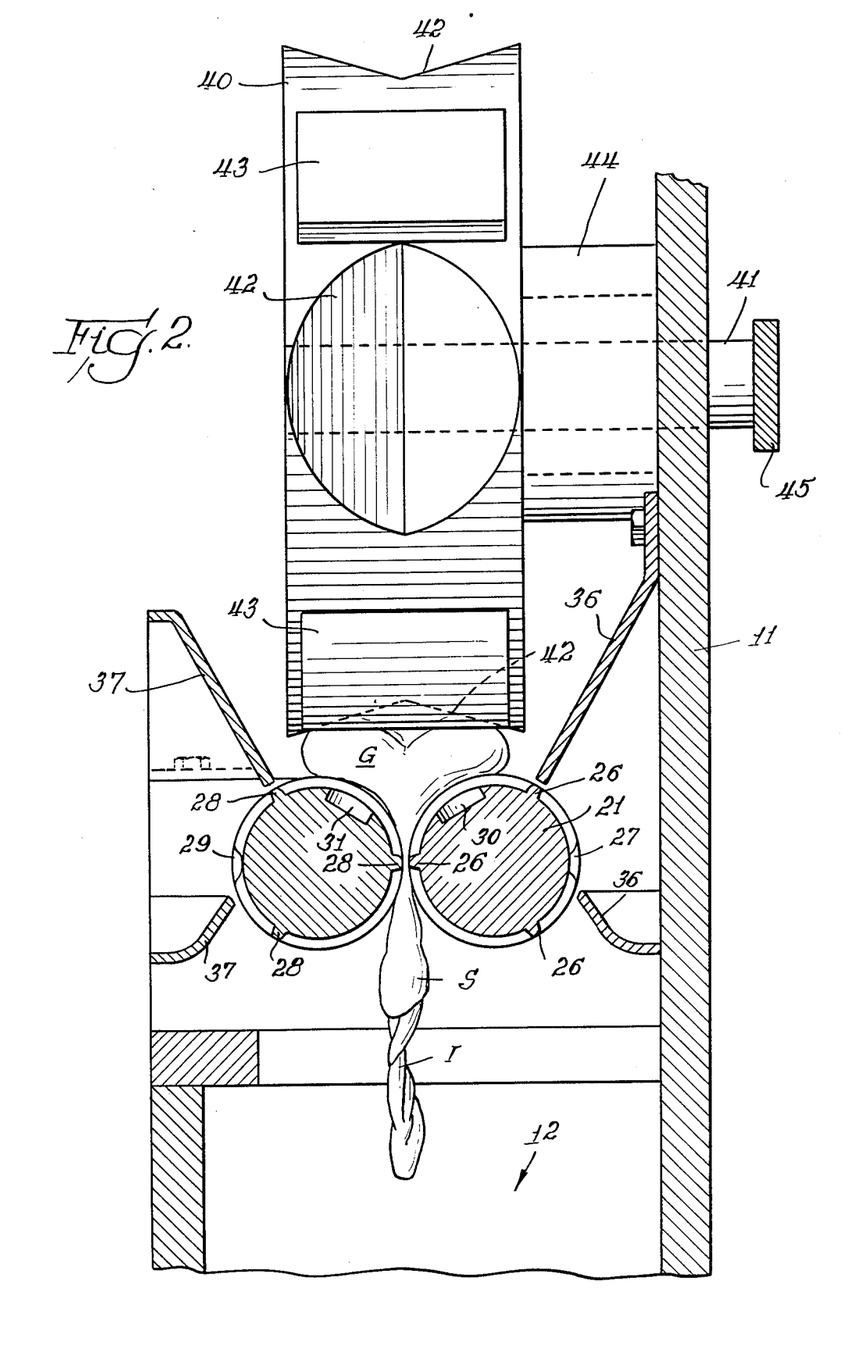
FIG. 2 is an enlarged cross-sectional elevational view of the initial feeding and aligning section of the harvester, as viewed along the line 2—2 in FIG. 1, showing a gizzard having the intestine and stomach attached and engaged between the in-feed rolls and the orientation drum.
Figures 4, 4A:
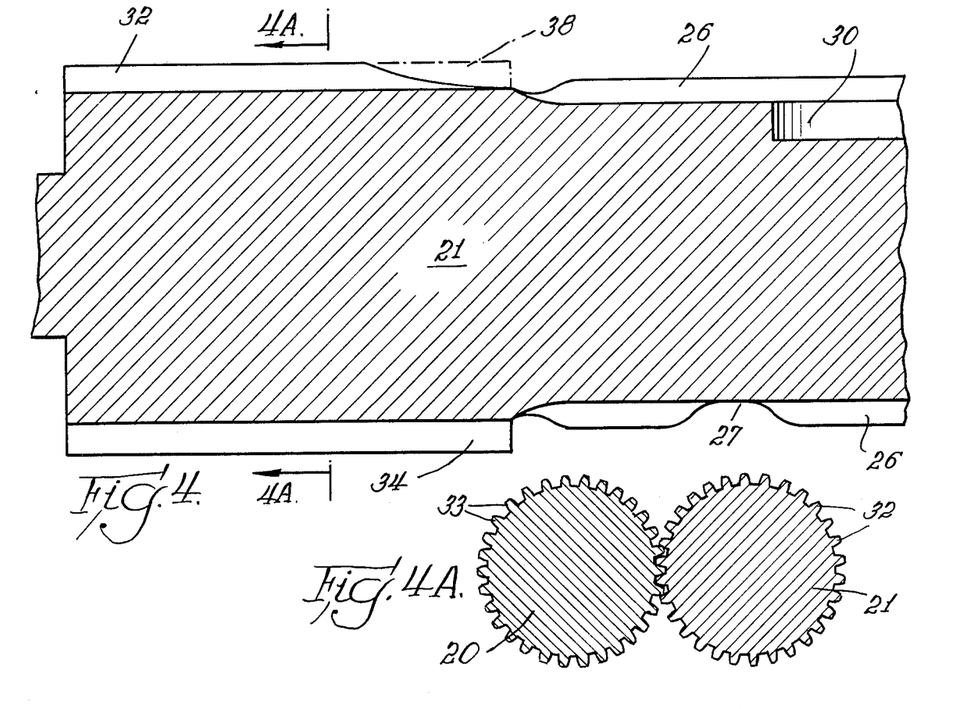
FIG. 4 is an enlarged developed cross-sectional view of one in-feed roller taken along the center line of a spiral drive spline provided on the roller.
FIG. 4A is a cross-sectional view of the in-feed roller taken along the line 4A—4A in FIG. 4, illustrating the engaged spiral gears provided on the in-feed rollers.

More specifically, the feeding and aligning station 20 includes a pair of parallel in-feed rollers 21, 22 which are arranged in a transverse position along the length of the station 20. The roller 21 is the master or drive roller in the illustrated embodiment, and the roller 22 is the slave or driven roller. Bearing blocks 23, 24 rotatably support the in-feed rollers 21, 22 in the station 20. A suitable chain drive, or other means such as an independent hydraulic drive motor (not shown), can be utilized to drive the master roller 21. As shown in FIGS. 1 and 4A, mating spiral gearing 32, 33 provided on the discharge end of the rollers 21 and 22, respectively, transmit the drive from the drive roller 21 to the drive roller 22. The rollers 21 and 22 are thereby simultaneously driven at the same speed, in a rotary direction toward each other. As seen in FIG. 2, the rollers 21 and 22 are also spaced apart a selected distance, to define a space therebetween for receiving the attached portions including the stomachs S and the intestines I of the gizzards G which are randomly directed toward the station 20 by the hopper 16.

The rotating in-feed rollers 21 and 22 function in accordance with this invention to draw the attached portions including the stomach S and the intestines I of the gizzards G downwardly between the rollers, to thereby apply an initial orienting force to the gizzard. This initial force moves the gizzard from its random pattern within the hopper 16 to a position which is generally centrally located over the rollers 21 and 22. The rollers 21, 22 also apply a pulling force to the stomach S and intestines I to drive the gizzards G transversely along a predetermined path within the station 20. Splash plates 36 and 37, as shown in FIG. 2, are mounted on the frame 11 adjacent the rollers 21 and 22, respectively. These plates minimize the splashing of the gizzards G by the contaminated liquid flowing in the flush trough 12. The plates 36 and 37 also prevent the stomach S and intestines I from wrapping around the rollers 21, 22.

To perform these functions, the in-feed roller 21 is provided with spiral transfer splines 26 which extend substantially throughout the length of the roller. Similarly, the mating roller 22 includes identical spiral transfer splines 28. As illustrated in FIGS. 1-4, the splines 26, 28 are arranged to be in alignment with each other as the rollers 21, 22 rotate toward each other. Furthermore, the rollers 21 and 22 are positioned to provide a selected spacing between the splines 26 and 28 during the operation of the rollers, as illustrated in FIG. 2. The splines therefore engage with the stomach S and the intestines I of the gizzard G, as shown in FIG. 2, to pull the stomach and intestines downwardly between the rollers 21, 22. This pulling action orients the gizzard G in the initial central orientation illustrated in FIG. 2. The spiral configuration of these splines 26, 28 simultaneously applies a transverse component of force to the gizzard G through the stomach S and intestines I. Hence, the rollers 21, 22 apply a transverse force component and a downward force component to each gizzard G to arrange the gizzard in its initial position while transporting the gizzard laterally within the station 20.

The preferred form of rollers 21 and 22 also include mating recesses which facilitate the feeding of the stomach S and intestines I of each gizzard G downwardly between the rollers 21 and 22, into the position shown in FIG. 2 of the drawings. In this regard, the spiral transfer splines 26 on the roller 21 are provided with transversely spaced scallops 27. Similar scallops 29 are provided on the spiral transfer splines 28 of the mating roller 22. As seen in FIGS. 1 and 2, the scallops 27, 29 are spaced uniformly along the associated splines, and are positioned on the rollers 21, 22 to be in direct alignment as the rollers rotate. The mating scallops 27, 29 thereby provide an enlargement of the space between the rollers 21, 22, to facilitate the feeding of the stomach S and intestines I therebetween.

In the same regard, the rollers 21, 22 also include spaced transfer slots 30 and 31, respectively. As shown in FIGS. 1 and 2, transfer slots 31, 32 are also arranged on the periphery of the rollers 21, 22 to be in mating alignment as the rollers rotate and are also uniformly positioned along the length of each roller 21, 22. The slots 30, 31 thereby cooperate with the scallops 27 and 29 to define openings which further enlarge the space between the rollers 21 and 22 and facilitate the feeding of the intestines I and the stomach S downwardly between the rollers. The relative size and position of the scallops and slots on each roller is illustrated schematically by the developed view of the roller 21 in FIG. 4. In FIG. 4, an enlarged roller 21 is sectioned along the center line of a spline 26, to illustrate the configuration of the scallops 27 and the slots 30.

Figure 3:
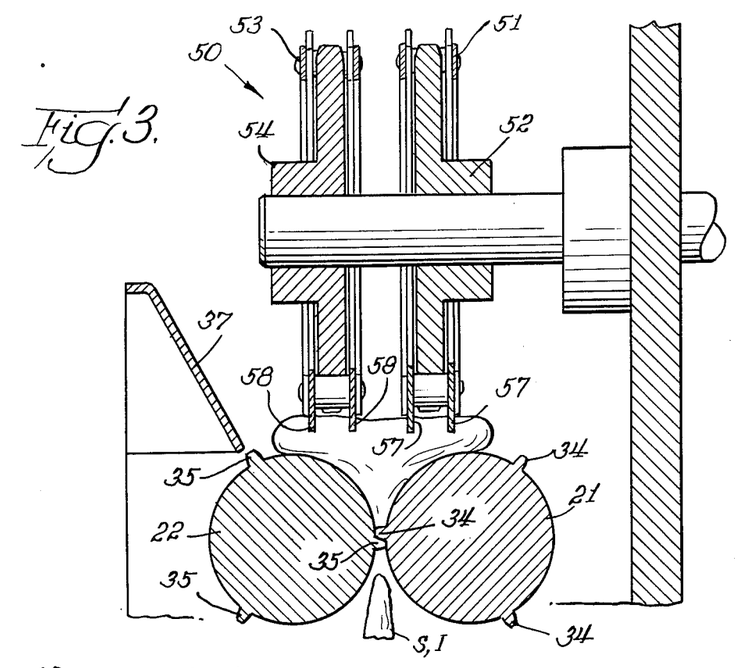
FIG. 3 is an enlarged cross-sectional elevational view of the shearing station of the harvester, as viewed along the line 3—3 in FIG. 1, showing a gizzard secured in a preselected position between the dual holding and conveying chains and the in-feed rollers, and further showing the stomach and intestines being sheared away from the gizzard.

As noted above, and as illustrated in FIG. 4A, the discharge end of the in-feed rollers 21, 22 include mating spiral gear teeth 32 and 33, respectively. These gear teeth function to transmit the driving force of the roller 21 to the driven roller 22. The spiral gear teeth 32, 33 also operate as a secondary or back-up shearing system for removing the stomach S and intestines I from the gizzards 20. In accordance with this invention, the primary system for shearing the stomachs S and intestines I from the gizzards is by the operation of spiral shearing blades 34 and 35 provided on the discharge end of rollers 21 and 22, respectively. As illustrated in FIGS. 3 and 4, the spiral shearing blades 34, 35 mate together in a scissors-like relationship, as the rollers 21 and 22 rotate during the operation of the harvester 10. The blades 34, 35 are formed by cutting away a portion 38 of the spiral gear teeth 32, 33 on the rollers 21 and 22 except for the spiral blades 34, 35. In the illustrated embodiment, as noted in FIG. 3, the cut away 38 is designed to leave three uniformly spaced shearing blades 34 on the roller 21, and three uniformly spaced and mating shearing blades 35 on the mating roller 22. In normal operation, the blades 34, 35 will perform the complete shearing operations. The teeth 32, 33 perform shearing functions only if the blades 34, 35 have been broken or dulled substantially.

The shearing blades 34 and 35 are arranged to shear the stomach and intestine S, I from the gizzard G as close as practical to the body of the gizzard G. Nevertheless, because of the variations in the size of gizzards and the variance in the location of the stomachs S and I during the orientation of the gizzards in the machine, the complete removal of the stomach and intestines may not occur as a result of the operation of the shears 34, 35. A minor residue of the tender lining, identified as the nib N in FIG. 7, usually remains on the gizzard G after the stomach S and intestines I have been sheared. In accordance with this invention, the nib N, representing the remainder of the tender lining on the gizzard, is trimmed off at a subsequent operating station in the harvester 10.

Since the position of the gizzards G is controlled by the stomach S and intestines I as a result of the operation of the rollers 21 and 22, it is important to align each of the gizzards in a predetermined position for further processing, and to secure the gizzards in that predetermined position, before the stomachs and intestines are sheared by the shearing blades 34 and 35. The harvester 10 therefore includes an orientation system for cooperation with the feed rollers 21 and 22 to apply an additional orientation or alignment force to each gizzard at the feeding and aligning station 20.

In the illustrative embodiment, this aligning system comprises an orientation drum 40 positioned on the harvester 10 at the station 20. As shown in FIG. 1, the orientation drum 40 is spaced a predetermined distance from the rollers 21, 22, and is adapted to receive the gizzards G between the rollers and the drum. As shown in FIG. 2, the drum 40 is rotatably supported on a drum axle 41 which is pivotally mounted on the frame 11. A slide bearing 44 and a counterweight 45 operate through the shaft 41 to provide the drum 40 with a floating support. The drum 40 is thus counter balanced to float above the rollers 21, 22 to accommodate gizzards G of different sizes and configurations. The drum 40 is driven at a selected speed by the shaft 41 and a suitable drive means (not shown). In the illustrated embodiment, the drum 40 is driven at a constant speed coordinated with the speed of the in-feed rollers 21, 22.

To perform its orientation functions, the orientation wheel 40 includes a plurality of peripheral recesses or pockets 42. In the illustrated embodiment there are four pockets 42 uniformly spaced at 90 degree positions around the periphery of the drum 40. As shown in FIG. 2, each pocket 42 is formed by a concave recess provided in the periphery of the drum 40. In the preferred arrangement, the recesses are formed to have converging side surfaces so that a concave opening is defined by each pocket 42 above the feed rollers 21 and 22. It has been found that a suitable pocket 42 for receiving gizzards is formed when the converging surfaces of the pocket 42 are arranged at an angle of approximately 15 degrees from the plane of the rollers 21, 22. As a result, as shown in FIG. 2, each pocket 42 forms a concave, generally V-shaped opening on the surface of the drum 42.

By this arrangement the pockets 42 can sequentially engage with the gizzards to directly apply a second orientation force to each gizzard. This second orientation force complements the forces being applied to the gizzard G through the stomach S and intestines I by means of the feed rollers 21, 22. As seen in FIG. 2, these orientation forces caused by the drum 40 and the roller 21, 22 cooperate to orient the gizzard G into a predetermined position at the station 20, in generally central alignment with the rollers 21 and 22.

In the operation of the drum 40, when a pocket 42 is positioned adjacent the rollers 21, 22, the above-described orientation force is applied, and the pocket 42 provides an opening through which the gizzard G can be transported down the path of travel in the station 20. The portions of the drum 40 between the pockets 42 do not provide such an opening above the rollers 21 and 22, and will operate to retard the movement of adjacent gizzards G through the station 20. Hence, the orientation wheel 40 performs a timing function as well as an orientation function. The timing function results in the timed motion of the gizzards G past the drum 40, and a relatively uniform transverse spacing of the gizzards G along the in-feed rollers 21 and 22.

To assist this timing function, the drum 40 preferably includes timing projections 43 positioned on the drum periphery between each of the pockets 42. As seen in FIGS. 1 and 2, these projections 43 will positively engage each gizzard G, and assist in positioning the gizzards in the pockets 42, and in moving the gizzards transversely through the pockets 42 and past the drum 40 on the rollers 21, 22. As a result, the gizzards G are oriented in a predetermined position for further processing, and are spaced in a generally uniform transverse pattern by the operation of the drum 40. The chances that the high-speed operation of the harvester 10 will be jeopardized by a malfunction due to the misalignment of a gizzard, or to the crowding or bunching of gizzards along the processing path, are substantially reduced by this arrangement.

The harvester 10 in accordance with this invention also includes movable conveyor means to secure each gizzard G sequentially in its predetermined orientation established by the operation of the in-feed rollers 21, 22 and the orientation drum 40. In this regard, the harvester 10 includes a central shearing section 50 which includes a dual conveyor chain arrangement comprising chains 51, 53. Drive sprockets 52 and 54, illustrated in FIGS. 1 and 3, drive the dual chains 51, 53 at a uniform preselected speed. Guide plates, such as plate 56 shown in FIG. 1, extend transversely through the station 50 to control the path of travel of the chains 51, 53 during the operation of the harvester 10. The chain 51 includes uniformly spaced flights or projections 57, and the chain 53 includes similarly spaced flights or projections 58. As illustrated in FIG. 3, the projections 57 and 58 on the chains 51, 53 firmly engage with the gizzard G after the gizzard has past the orientation drum 40. To assure that the gizzards G are thereby secured in the desired preselected orientation, the dual chains 51 and 53 are spaced above the discharge end of the in-feed rollers 21 and 22, and extend to a position closely adjacent the orientation wheel 40, as shown in FIG. 1. The mounting of the drive sprockets 52 and 54 can be a suitable floating type mounting (not shown) which permits the dual chains 51, 53 to float above the rollers 21 and 22. This arrangement allows the chains 51, 53 to accommodate for gizzards of varying sizes.

As shown in FIG. 1, the arrangement of the dual chains 51, 53 is selected so the chains engage with the gizzards G before the chains are in contact with the spiral shearing blades 34 and 35 provided at the shearing station 50. Accordingly, the gizzards G will be secured in their predetermined positions before the stomach S and intestines I are sheared from the gizzards by the operation of the shearing blades 34, 35. The sheared stomach S and intestines I will drop by gravity into the flush trough 12, for disposal in a conventional manner. A spray head 60 positioned at the shearing station 50 keeps the chains 51, 53 clean and assists in flushing the stomach and intestines into the trough 12. The spray head 60 also will assist in keeping the meshing gears 32, 33 (see FIG. 4A), provided at the adjacent end of the feed rollers 21 and 22, in clean condition by preventing the buildup of waste on the gears 32, 33 and the shearing blades 34, 35, caused by the shearing operation.

The dual chains 51 and 53, in addition to securing the gizzards G in a predetermined orientation, operate to convey the gizzards uniformly into a slitting station 70 provided in the harvester 10. To assist in transferring the gizzard G, from which the stomach and intestines have been removed, into the station 70, the harvester 10 includes a pair of parallel transfer bars 59. As shown in FIG. 1, these bars 59 are spaced below the dual chains 51, 53 and span the space between the station 20 and the station 70. The transfer bars 59 thereby continue to support the gizzards G in the predetermined position against the chain 51 and 53, after the gizzards disengage from the in-feed rollers 21, 22.

Figure 5:
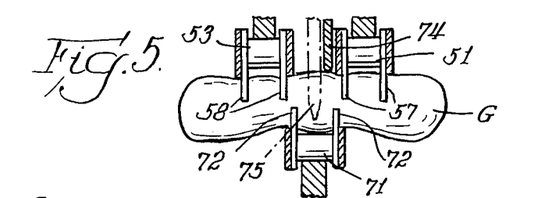
FIG. 5 is an enlarged cross-sectional elevational view of the slitting station of the harvester, taken along the line 5—5 of FIG. 1, showing a gizzard maintained in its preselected position and prepared to engage with and to be opened by a slitting saw.

The station 70 includes another conveying means in the form of a single transfer chain 71. As shown in FIG. 1, the chain 71 is an endless chain having uniformly spaced flights or projections 72. A drive sprocket 73, and a suitable idler sprocket (not shown) position the chain 71 between and below the dual transfer chains 51, 53. The chain 71 is spaced a predetermined distance from the chains 51, 53, in transverse alignment with the transfer bar 59. Thus, the gizzards G being transported into the station 70 by the chains 51, 53 will be transferred by the transfer bars 59 directly onto the aligned single transfer chain 71. As shown in FIG. 5, the flights 72 on the transfer chain 71 will engage with the gizzard G, and will cooperate with the flights 58 and 57 on the chains 53 and 51 respectively, to firmly secure the gizzard G in a predetermined position in the station 70.

Figure 6:
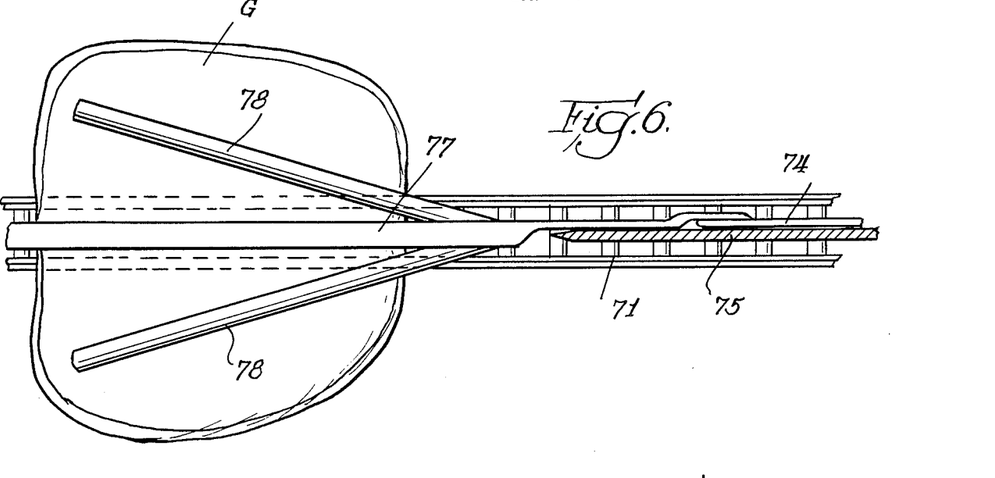
FIG. 6 is an enlarged cross-sectional plan view of a portion of the slitting station of the harvester, taken along the lines 6—6 in FIG. 1, showing a gizzard after being slit by the saw and opened by spreader means.

The movement of the chain 71 is coordinated with the movement of the chain 51 and 53 so that the gizzard G will be transported uniformly by all chains into engagement with a slitting saw 75. As shown in FIGS. 5 and 6, an upper support rail 74 projects transversely in general alignment with the chains 51, 53 and engages with the gizzards G. The support rail 74 projects beyond the center line 76 of the saw 75, as illustrated by the dotted lines in FIG. 1, and assists in retaining the gizzards G in a predetermined position on the chain 71, even after the gizzards have been disengaged from the chains 51, 53 after the slitting operation.

The saw blade 75 is rotatably positioned on a drive axle 76, as shown in FIG. 1. The axle 76 in the preferred embodiment is a floating axle, and is counter-balanced or spring biased to maintain the saw 75 in a selected position extending between the dual chains 51, 53. As shown in FIGS. 5 and 6, the saw 75 is also spaced a selected distance above the lower single chain 71. Thus, the saw 75 will engage with and slit the gizzards G being conveyed by the chains 51, 53 and 71 through the station 70. The floating mounting for the saw 75 will permit the saw to rise if an exceptionally large gizzard G is transmitted to the saw, or if contaminants such as stones and the like, which are typically found in gizzards, are engaged by the saw during the slitting operation. As shown in FIG. 5, the gizzards G are secured in their predetermined position during the slitting operation by the firm engagement of the three chains 51, 53 and 71.

After the slitting operation has been completed, the slit gizzards G are conveyed out of engagement with the dual chains 51 and 53 and into engagement with a spreader bar 77. As illustrated in FIGS. 1 and 6, the spreader bar 77 is extended above the single conveyor chain 71. Further, the spreader bar 77 projects across the axle 76 of the saw 75 into alignment with the support rail 74. By this arrangement, the spreader bar 77 will be positioned above the slit gizzards G as the gizzards are conveyed passed the saw 75 by the operation of the chain 71. The bar 77 extends into the slit of the gizzard created by the saw 75, and assists in maintaining the slit gizzard G in firm engagement with the conveyor chain 71 after the slitting operation.

As further shown in FIGS. 1 and 6, the spreader bar 77 includes downwardly and outwardly projecting spreader members 78. The spreader members 78 are positioned to engage with the separated portions of the gizzards G, to fold the portions downwardly into an opened position such as illustrated in FIG. 1. The gizzards G are thereby completely opened, to expose the internal contents of the gizzards and the interior lining or membrane of the gizzards for further processing. The gizzards G, in the opened condition, are then conveyed beneath power jet spray nozzles 79. The nozzles 79 operate to flush the stones and other contaminants from each gizzard into the flush trough 13. The cleaned and opened gizzards are now prepared for final processing.

The final processing of the gizzards G in harvester 10 occurs at the trimming and peeling station 80. In accordance with this invention, this station 80 performs the functions of trimming the residual tender lining from the gizzards G, and then peeling the interior lining or membrane from the gizzards. The gizzards are hence prepared for consumption, or for still further processing by other machines. In the illustrative embodiment, these trimming and peeling functions are performed at the station 80 by a pair of parallel trimming and peeler rolls 81 and 82.

Figure 7:
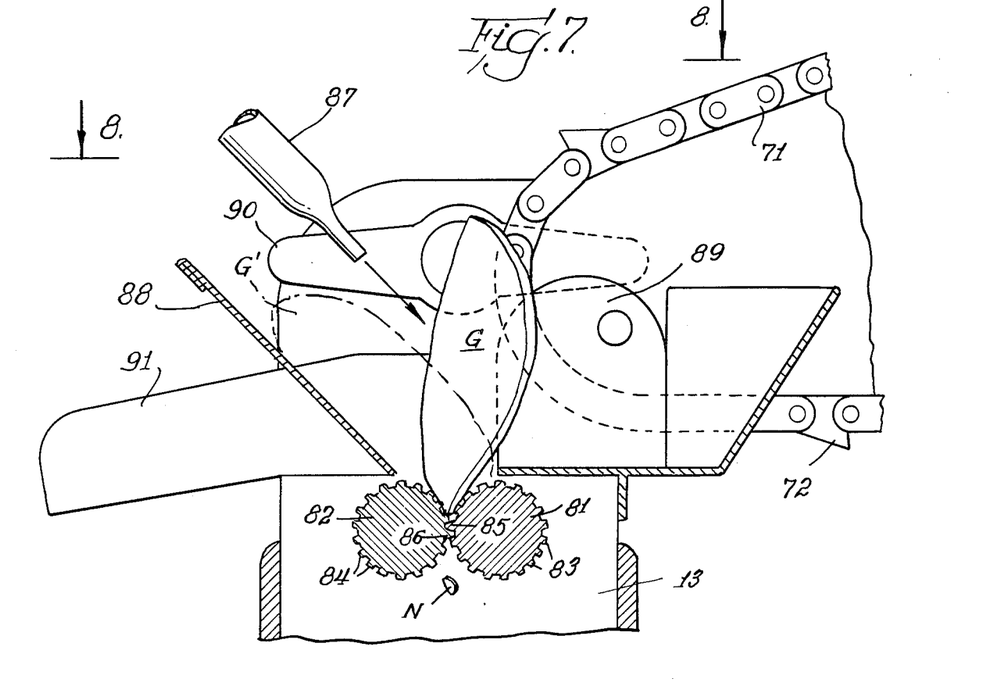
FIG. 7 is an enlarged cross-sectional elevational view of the trimming and peeling station of the harvester, showing a gizzard in an edge-wise orientation prepared for trimming of the tender lining therefrom.
Figure 8:
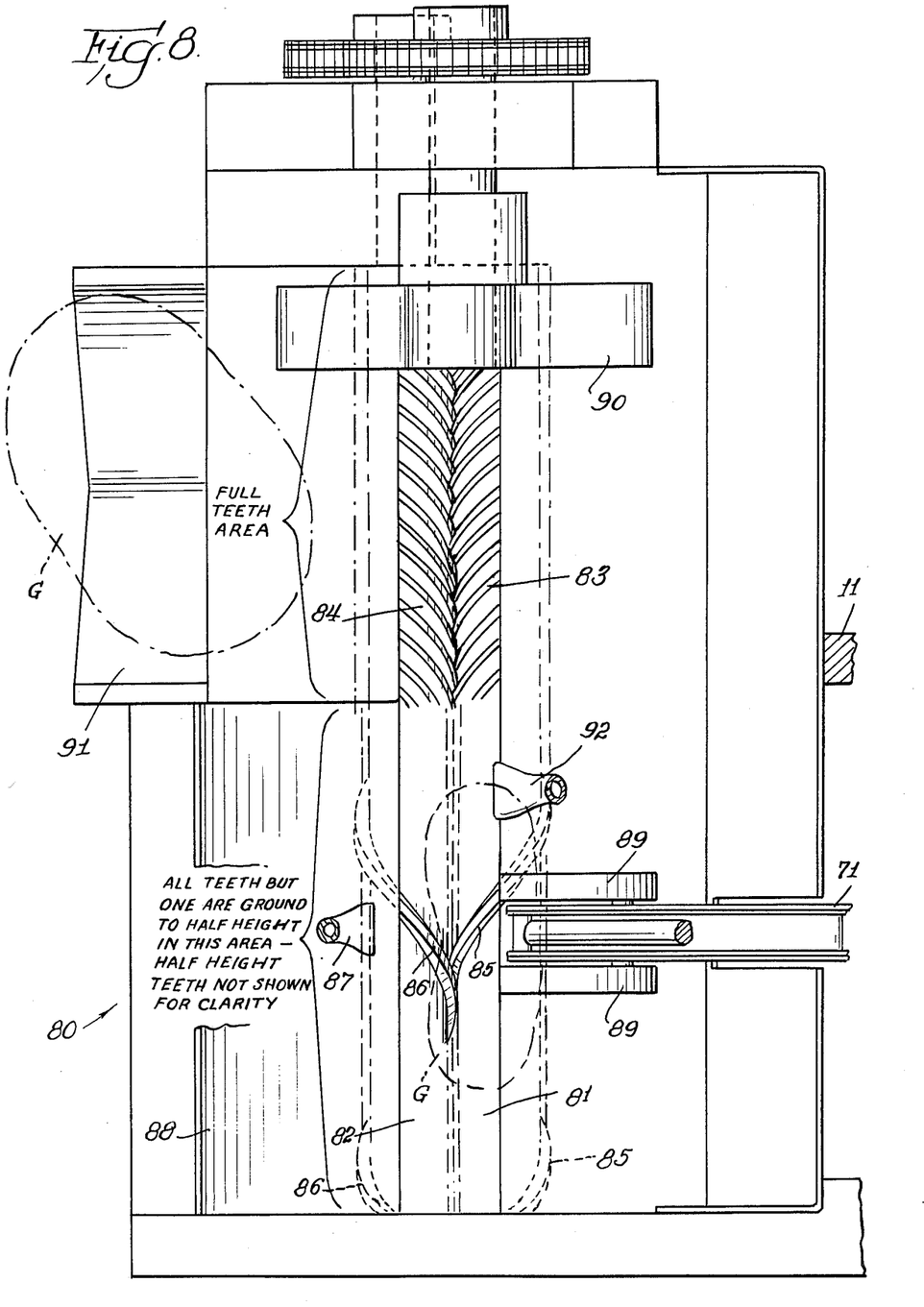
FIG. 8 is a plan view of the trimming and peeling station of the harvester, as viewed along the line 8—8 in FIG. 7, showing the peeling and discharge portions of the harvester.

The trimming and peeling station 80 is illustrated in detail in FIGS. 7 and 8. In the illustrated embodiment, a first area or section of the peeler roll 81 includes spiral peeler splines 83, as illustrated in FIG. 8. The mating area of the other peeler roll 82 includes similar spiral peeler spline 84, which mesh with the splines 83. This section of the mating peeler rolls 81, 82 is designed to engage with the interior membrane of the gizzard G, to peel the membrane from the gizzard and discharge the membrane into the flush trough 13. A second area or section of the peeler roll 81 is provided a spiral shearing spline 85, as also shown in FIG. 8. Further, the mating area of the adjacent peeler roll 82 includes a spiral shearing spline 86. As shown in FIGS. 7 and 8, the splines 85 and 86 engage in a scissor-like manner, and are adapted to shear the nib portion N of the tender lining which remains on the gizzard G. In the illustrated embodiment the shearing splines 85, 86 are formed by reducing the height of the splines 83, 84 on the rolls 81, 82 in the area of the rolls in alignment with the conveyor chain 71. The height of the splines 85, 86 is not reduced, so that the splines 85, 86 define scissor-like shearing blades for trimming the nib N from the gizzard G.

In order that the shears 85, 86 perform their trimming function efficiently, the gizzards G should be presented to the mating rolls 81, 82 in a selected orientation. Efficient trimming is obtained if, as shown in FIG. 7, the gizzard G is presented in an edge-wise fashion, so that the portion of the gizzard to which the stomach and intestines had been attached, including the nib N, initially is presented between the rolls 81, 82. This orientation of the nib N in this position usually occurs automatically in the harvester 10, since the stomach S and intestines I have been used at the station 20 to initially orient the gizzards G. Thus, when the stomach S and intestines I are trimmed from the gizzard G by the shearing blades 34, 35 (see FIG. 3) the nib N is presented in the proper position for later introduction between the rolls 81, 82, as shown in FIG. 7.

The station 80 includes a fluid jet 87 to assist in the edge-wise orientation of the gizzard G. As illustrated in FIG. 8, the jet 87 is in alignment with the chain 71, and directs a spray of water or other suitable fluid directly at the gizzard G as it is being directed into the station 80 by the chain 71. Since the peeler rolls 81, 82 are positioned below the return bend in the chain 71, the gizzard G is presented in an edgewise and essentially vertical position to the space between the rollers 81 and 82 as shown in FIG. 7. The fluid jet 87 assists in maintaining the gizzard G in that edgewise position during the trimming operation. Further, the station 80 includes an alignment tray 88, positioned in alignment with the chain 71. The tray 88 cooperates with the spray 87 to assure that the gizzard G is presented to the rolls 81, 82 edgewise at a presentation angle of between vertical at approximately 45 degrees from the vertical. It has been found that the presentation of the gizzard G to the rolls 81, 82 in this fashion, assures that the tender lining nib N will be trimmed by the shearing blades 85, 86.

After the trimming is completed, the gizzard engages with strippers 89 which are positioned on opposite sides of the chain 71. As shown in FIGS. 7 and 8, the strippers 88 assist in maintaining the gizzard G in the proper orientation for the trimming operation, and also strip the gizzard from the chain 71 as the chain continues to be driven on its return leg. After the trimming is completed, the peeler rolls 81 and 82 operate to pull the gizzard G downwardly against the spiral peeler teeth 83 and 84, and to simultaneously transport the gizzards laterally along the peeler rolls. The interior membrane of the gizzard G is thereby removed by the peeler splines 83 and 84, and discharges into the flush trough 13. A spray nozzle 92, as shown in FIGS. 1 and 8, assists in keeping the peeler rolls 81 and 82 clean during this trimming and peeling operation. Finally, the trimmed end peeled gizzard G is engaged by a rotary and flexible knocker 90, which propels the gizzard from the harvester 10 by means of the final discharge chute 91.

In view of the above description of the illustrated embodiment of the harvester 10, the features and advantages of the apparatus and process of the present invention will be understood by describing the operation of the harvester in a typical poultry gizzard processing assembly line. In this assembly line, operators will be stationed adjacent hopper 16 to transfer the gizzards from a chicken or other poultry carcass into the harvester 10. Preferably, one operator is positioned at each end of the hopper 16 so that two operators are discharging gizzards including attached stomachs and intestines into each inclined end of the hopper 16 in a random arrangement. The gizzards and attachments are directed by gravity down inclined bottom walls 18 and the chute 19, into the feeding and alignment station 20.

In the station 20, each gizzard G is directed into engagement with the rotating surfaces of the in-feed rollers 21, 22. The spiral feeding splines 26, 28 on the rollers, which are rotating toward each other, feed the stomach S and the intestines I of each gizzard G downwardly between the rollers into a position such as shown in FIG. 2. The recessed scallops 27, 29 on the splines, and the recessed slots 30 and 31 on the rollers 21 and 22, assist in feeding the stomach S and intestines I between the rollers. The in-feed rollers 21 and 22 thereby apply an initial orienting force to each gizzard G as it is discharged from the chute 19. This initial orienting force includes a downward component which holds the gizzard G against the surface of the rollers 21 and 22 in a generally central orientation, such as illustrated in FIG. 2. Furthermore, the spiral configuration of the splines 26, 28 add a transverse component to this initial orienting force which functions to transport the gizzard G along a predetermined path between the roller 21 and 22. Thus, the attached portions of the gizzard G including the stomach and the intestines are utilized to apply initial orienting and transporting force components to each gizzard G.

As the station 20 continues to operate, the gizzards G are transported laterally through the station into engagement with the rotating orientation drum 40. As the gizzard G is engaged by a spaced pocket 42 on the drum 40, an opening is created which will permit the gizzard G to continue its transverse movement along the path of travel defined by the in-feed rollers 21, 22. As shown in FIG. 2, the concave configuration of the pocket 42 assists in further centering the gizzard G above the rollers 21 and 22. The drum 40 operates through the pocket 42 to apply a second orienting force to the gizzard G which positions the gizzard in a selected predetermined position, by cooperating with the forces applied to the stomach S and intestines I by the rollers 21, 22, as described above.

Moreover, the operation of the drum 40 causes the timing projections 43 to engage with adjacent gizzards, to retard the movement of the gizzards G past the drum 40 until a pocket 42 is presented for receipt of the gizzards. In this manner, the drum 40 and the timing projections 43 function to time the motion of the gizzards G, so that the gizzards G become generally uniformly spaced in a transverse arrangement during the further processing steps of the harvester 10. The plates 36 and 37 function to minimize the splashing of the gizzard G by the contaminated liquid in the flush trough 12, and also operate to minimize the twisting of the stomach S and intestine I around the rollers 21, 22 during the operation of the harvester.

The orientation drum 40 thus cooperates with the feed rollers 21, 22 to orient the gizzards G in a predetermined position, prepared for further processing in the harvester 10. The rollers 21, 22 then feed the gizzard in its proper orientation into engagement with the dual chains 51 and 53. These chains secure the gizzard in this predetermined orientation. After the gizzards are so secured, continued operation of the rollers 21 and 22 cause the shearing blades 34 and 35 to trim the stomach S and intestines I from each gizzard.

Next, the conveyor chains 51 and 53 transfer the gizzards without the stomach and the intestines, into a splitting and spreading station 70. The gizzards G become engaged by the single chain 71, so that they are supported by a three-point support during the splitting operation. Then, the gizzards are conveyed into engagement with the rotary splitting saw 75, and are split open. The support rail 74 and the spreader bar 75 cooperate to maintain the gizzard in the proper orientation with respect to the chains 71, 51 and 53 during this operation. Furthermore, the spreader bar 77 also secures the split gizzards on the chain 71. As the gizzards are conveyed from the saw 75, they engage with the spreader bar members 78, to be spread open for flushing. The flush nozzle 79 then operates to cleanse each gizzard as it is conveyed by the chain 71 to the trimming and peeling station 80.

At the peeling and trimming station 80, the gizzards are directed around the return bend of the chain 71, so that they are presented in a generally vertical edgewise position which orients the tender lining nib N between the rolls 81 and 82. The shearing blades 85, 86 on the rolls then trim the nib N from the gizzard. The fluid jet 87 and the alignment tray 88 assist in maintaining the gizzard G in the proper orientation during this trimming operation. The continued operation of the chain 71 then directs the gizzard against the strippers 89, which remove the gizzard from the chain 71. The free gizzard G is then drawn downwardly by the operation of the rolls 81 and 82, so that the interior lining or membrane of the gizzard comes into contact with the peeler splines 83 and 84 on the rolls 81, 82. The interior membrane is thereby peeled away from the gizzard, as the gizzard is transported laterally through the station 80. Finally, the trimmed, peeled and cleaned gizzard is engaged by the knocker 90 and directed down the discharge chute 91. The operation of the harvester 10 is thus completed.

Although the invention has been described above with a certain degree of particularity with respect to the apparatus and the method for processing poultry gizzards, it should be understood that this disclosure has been made only by way of example. Consequently, numerous changes in the details of construction and in the combination and arrangement of the components, as well as in the possible modes of utilization and methods of operation, will be apparent to those familiar with the art and may be resorted to without departing from the scope of the invention as claimed.

What is claimed is:

1. In a poultry gizzard processing apparatus the improvement comprising a station for processing a plurality of gizzards which have been slit and opened to expose the interior membrane of the gizzards and from which the stomachs and intestines have been removed so as to leave a minor portion of tender lining attached to each gizzard, said station comprising:
   means for conveying said opened gizzards to said station in a predetermined position;
   shearing means positioned at said station to receive said opened gizzards from said conveying means and adapted to shear said remaining minor portion of the tender lining from each gizzard; and
   peeling means adapted to peel the interior membrane from each opened gizzard.

2. A poultry gizzard processing apparatus in accordance with claim 1 wherein said shearing means comprises a pair of mating shearing blades and said conveying means directs said opened gizzards to said station in an edgewise orientation which presents said remaining tender lining on said gizzard between said shearing blades.

3. A poultry gizzard processing apparatus in accordance with claim 2 wherein said shearing means comprises a pair of mating spiral shearing blades positioned for rotation at said station and adapted to receive said tender lining of said gizzard therebetween.

4. A poultry gizzard processing apparatus in accordance with claim 2 or 3 wherein said station includes gizzard support means including a fluid jet stream to assist in presenting said gizzards to said shearing means in said edge-wise orientation.

5. A poultry gizzard processing apparatus in accordance with claim 1 wherein said peeling means comprises a pair of peeling rolls spaced adjacent each other and having spiral teeth engagable with each gizzard to peel the interior membrane therefrom.

6. A poultry gizzard processing apparatus in accordance with claim 1 wherein said shearing means comprises a pair of mating shearing blades positioned for rotation at said station and said peeling means comprises a pair of peeling rolls positioned for rotation at said station and aligned with said shearing blades so that said shearing blades shear said tender lining from said gizzard and direct said gizzard to said peeling rolls to peel the interior membrane from said gizzard.

7. A poultry gizzard processing apparatus in accordance with claim 6 wherein said mating shearing blades are spiral and said peeling rolls include spiral teeth engagable with each gizzard to peel the interior membrane therefrom.

8. A poultry gizzard processing apparatus in accordance with claim 7 wherein said spiral shearing blades and said spiral peeling teeth are arranged concentrically on a pair of rotatable shafts positioned at said station.

* * * * *